United States Patent [19]
Gelardi et al.

[11] Patent Number: 5,126,093
[45] Date of Patent: Jun. 30, 1992

[54] INSIDE OUT MOLDING OF HIGH ASPECT RATIO CONTAINERS

[75] Inventors: Paul J. Gelardi, P.O. Box 127, Cape Porpoise, Me. 04014; John A. Gelardi, Cape Porpoise, Me.

[73] Assignee: Paul J. Gelardi, Kennebunkport, Me.

[21] Appl. No.: 752,175

[22] Filed: Aug. 23, 1991

Related U.S. Application Data

[63] Continuation of Ser. No. 556,377, Jul. 23, 1990, abandoned.

[51] Int. Cl.⁵ .............................................. B29C 45/00
[52] U.S. Cl. .................................... 264/295; 220/6; 220/339; 249/52; 264/328.1; 264/339
[58] Field of Search ...................... 220/6, 339; 249/52; 264/295, 328.1, 339

[56] References Cited

U.S. PATENT DOCUMENTS

| | | | |
|---|---|---|---|
| 3,688,384 | 9/1972 | Mizushima et al. | 264/295 |
| 3,907,193 | 9/1975 | Heller | 220/339 |
| 4,428,481 | 1/1984 | Basili | 220/339 |

Primary Examiner—David A. Simmons
Assistant Examiner—Merrick Dixon
Attorney, Agent, or Firm—James Creighton Wray

[57] ABSTRACT

High aspect ratio boxes and sleeves are molded inside out by molding the outer surfaces of box covers and bottoms and sleeve sides in closely spaced parallel relationship, with side walls extending outward. Backs are joined to the covers and the bottoms by living hinges. The inside out molding process and apparatus reduce effective mold areas and mold forces, providing capacities to mold more boxes at a time in existing press facilities.

7 Claims, 3 Drawing Sheets

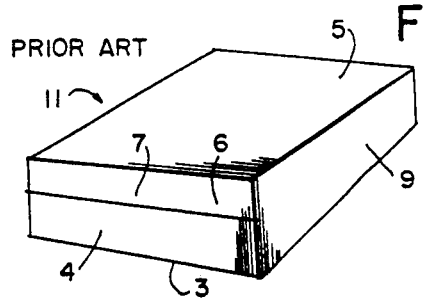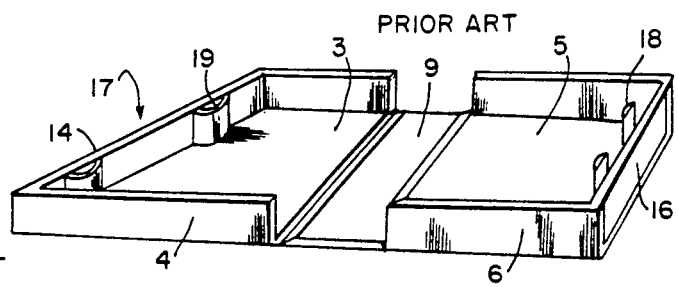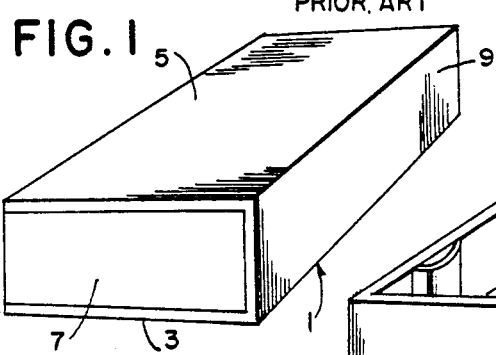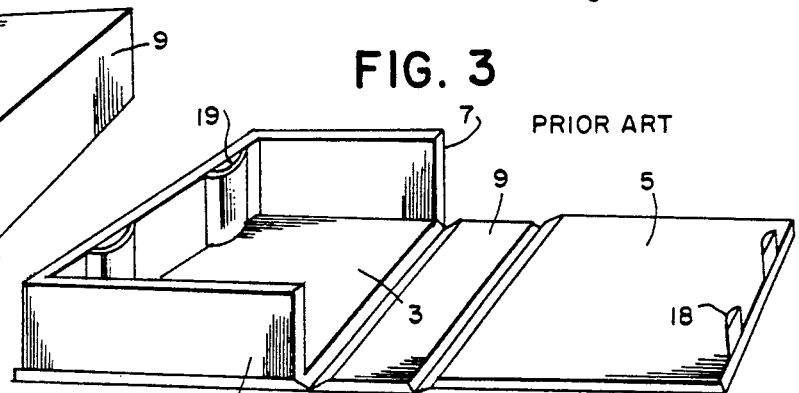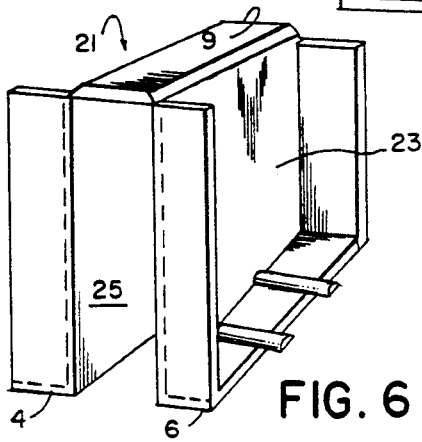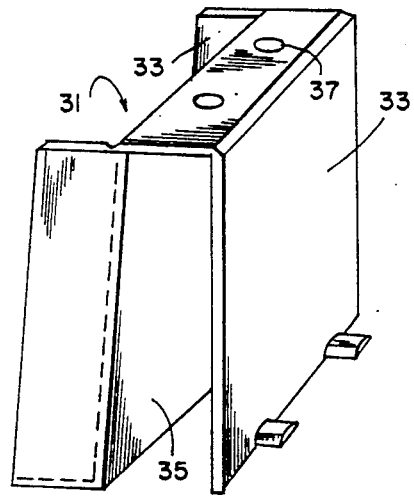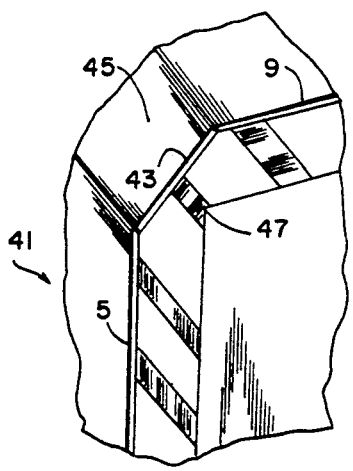

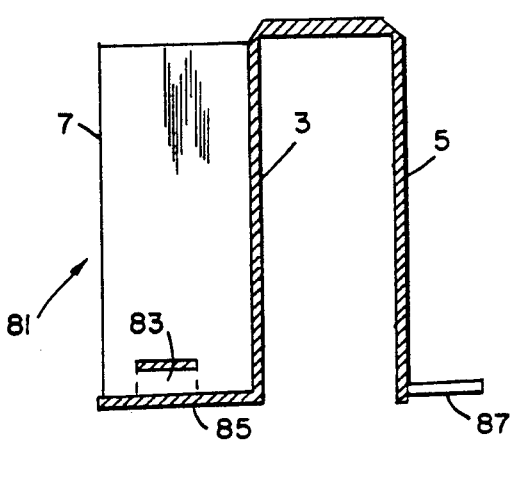
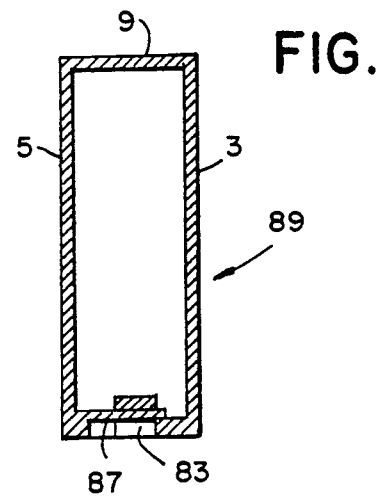
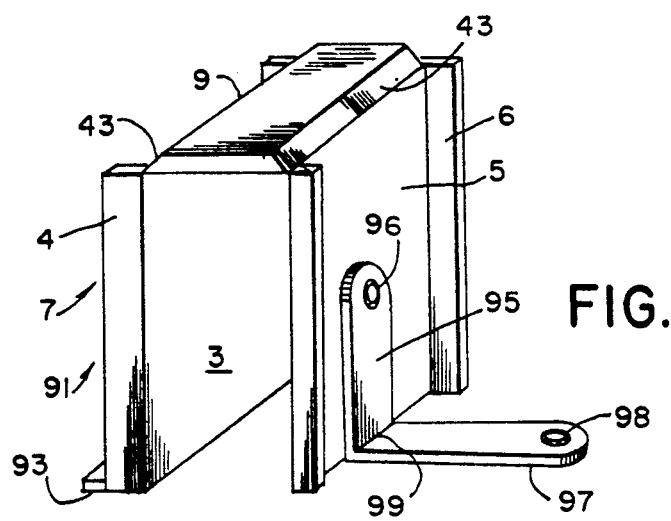
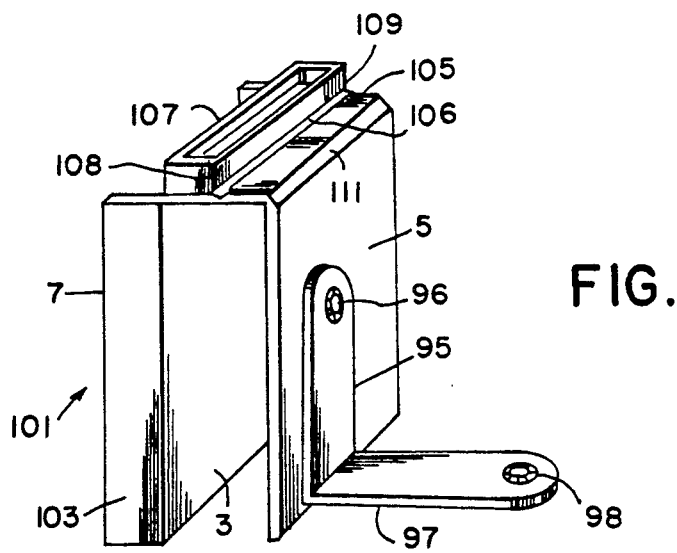

INSIDE OUT MOLDING OF HIGH ASPECT RATIO CONTAINERS

This application is a continuation of Ser. No. 07/556,377 filed Jul. 2, 19 now abandoned.

BACKGROUND OF THE INVENTION

One of the problems associated with molding boxes, and particularly high aspect ratio boxes in molds, is that a large projected area is required to form the cavity and core which is sufficient to make the mold. Particular shapes within a box require unsupported or undersupported standing mold cores. In conventional molding processes, the unsupported or undersupported standing mold cores are often the weakest point of a mold and the point which first fills or loses tolerance, requiring downtime and repair.

Projected area in a mold is directly related to force required in the molding process.

Problems have for a long time existed and remain in the molding of high aspect ratio containers.

Boxes are usually molded flat with covers and bottoms molded in substantially a similar plane, or in parallel planes having mold cavity areas which extend outward from each other.

Some boxes, such as, for example, containers for video cassettes, are molded with the cover, back and bottom in a single plane. Three side walls of the box, the two spaced lateral walls and the front wall are rigidly molded in upward extension from the bottom. The cover has upward extensions for alignment and engagement with the side walls, usually inside of the side walls, to ensure accurate joining of the cover and side walls. Alignment and detent features in the side walls and in the cover secure the box in closed position. The reduced thickness strips which join the bottom with the back wall and the cover with the back wall form living hinges which fold to complete the form of the cover. The entire box when closed looks like the binding of a book. A problem exists in the molding of such a box, in that the flat molding of the cover, bottom and back requires a high projected area of a mold.

Five-sided sleeves have been made from a single mold using a cavity and core in which the core forms the inner wall surfaces of the five-sided sleeve, and the cavity forms the outer wall surfaces. The deep unsupported core causes a tolerance problem and usually is the first mold part to require maintenance. Even when properly maintained, the high pressures of molding cause lateral diversion of the core, creating tolerance problems.

Problems exist in molding large aspect ratio boxes because of the required areas of the mold, and because of the unsupported or undersupported cores required in the molding of the high aspect ratio boxes.

Typical high aspect ratio boxes are used for holding video cassettes. Other typical high aspect ratio boxes, known as Jewel boxes, are used for holding compact discs. The box has been manufactured in three parts, the box, the cover and an insert. The three-part molding adds expense to the box. That type of high aspect box requires large projected areas in a mold, or requires large unsupported or undersupported cores.

Problems exist in the manufacture of high aspect ratio boxes. Those problems have been of long standing and have not been solved by known molding processes or apparatus.

SUMMARY OF THE INVENTION

The present invention uniquely provides an inside out molding of high aspect ratio boxes, which uniquely reduces projected area required for individual boxes, and which avoids the use of unsupported or undersupported cores.

High aspect ratio boxes having parallel surfaces with relatively small thicknesses are molded inside out, with inner surfaces formed by a mold cavity, and outer surfaces formed by a mold core. The boxes then are folded together to use reduced projected mold areas as compared with flat molded boxes, and to use supported cores. A high aspect ratio box is molded inside out by molding the cover and bottom in closely spaced parallel or nearly parallel relationship, with side walls extending outward from the large flat walls, and a back joined to the cover and bottom wall by living hinges. The inside out molding process and apparatus reduce the effective mold area and reduce required mold force, providing a capacity to mold an increased number of boxes in a single press.

A box having a high aspect ratio of flat surface to depth is molded in an inside out mold by forming a box bottom cavity facing in one direction in a mold, and a box top cavity facing in an opposite direction in a mold, with planar cavities for forming the top and bottom surfaces being arranged parallel in the mold, and with a box back-forming cavity being arranged transverse to the top and bottom surface-forming cavities, and being joined to the top and bottom surface-forming cavities by hinge-forming restrictions.

A preferred method of molding a box having a high aspect ratio of flatness to thickness comprises molding the box in a mold having a cavity with outer surfaces forming inner surfaces of the box, and having a core extending into the cavity for forming flat outer parallel surfaces of a top and a bottom of a box, and having an end of the core forming an outer surface of a back of the box, edges of the end of the core being closely spaced to corresponding edge portions of the cavity for forming hinges between the back of the box and the core.

One preferred method employs a recess in the box back-forming portion of the cavity for forming a hinge offset.

Preferably the recess in the back-forming portion of the cavity is positioned along one longitudinal half of the back-forming portion. A medial restriction in the back-forming portion provides a medial hinge. The medial hinge forms a hinge at an intersection between a back of the box and a top of the box. A separate hinge is formed between the top of the box and the cover.

In one embodiment, a first snap cavity is formed in the cavity portion which forms the inner wall of- the cover. A tongue cavity extends from an edge of the main cavity. A second snap cavity is formed on a distal end of the tongue cavity for forming a second snap for connecting to the first snap.

These and further and other objects and features of the invention are apparent in the disclosure, which includes the above and ongoing written specification, with the claims and the drawings.

BRIEF DESCRIPTION OF THE DRAWINGS

FIG. 1 shows a typical video cassette box of a widely used type.

FIG. 2 shows a typical video cassette box of another type.

FIG. 3 shows the box of FIG. 1 in its molded condition in which the bottom, back and top are molded in a single plane.

FIG. 4 shows the box of FIG. 2 in the molded position in which the bottom, back and top are molded flat, and in which rigid side wall sections and front wall sections extend upward from the bottom and top walls.

FIG. 5 is a detail of the present invention showing a preferred molding of the box shown in FIGS. 1 and 3.

FIG. 6 is a detail of the present invention showing a preferred molding configuration of the box shown in FIGS. 2 and 4.

FIG. 7 shows a detail of an edge of the box in the mold of the present invention between the bottom and back wall.

FIG. 11 is a detail of a preferred fastener showing a post hole in the front wall, and a post extending from the cover.

FIG. 12 is a detail of the joining of the post and post hole.

FIG. 13 is a schematic representation of a box molded according to the present invention with an interior detail.

FIG. 14 is a schematic representation of a box similar to the box shown in FIG. 13, but which is used as a thin CD box.

DETAILED DESCRIPTION OF THE DRAWINGS

Figure 8:
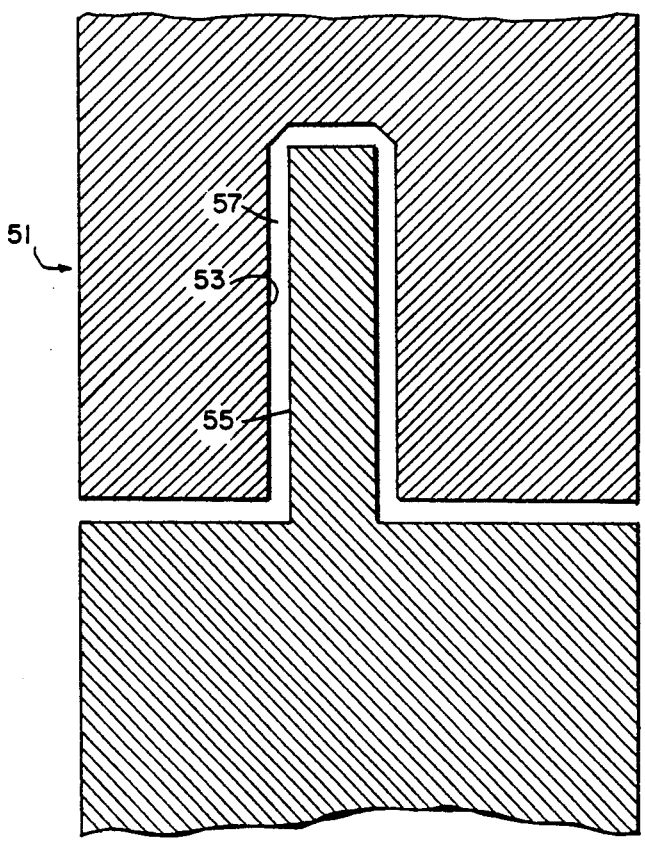
FIG. 8 is a schematic detail of a cavity and core.

Referring to the drawings, a typical high ratio box of the type, for example, used to enclose video cassettes is generally indicated by the numeral 1 in FIG. 1. The box has a bottom 3, a cover 5, side walls 7 and back 9. A similar box is generally indicated by the numeral 11 in FIG. 2. Box 11 has a similar bottom 3, cover 5 and back 9. Side walls 7 are divided into lower and upper halves 4 and 6.

As shown in FIGS. 3 and 4, the boxes 1 and 11 are molded in flat configurations. In the FIG. 4 embodiment, front wall 17 is made of front wall portions 14 and 16, which have alignment features 18 and 19. The box shown in FIGS. 1 and 3 has similar alignment and securing detents 18 and 19.

The high aspect ratio boxes as shown in FIGS. 1 and 2 require large projected areas in a mold, the accumulated areas of cover 5, base 3 and back 9, with attendant mold space requirements and requirements of relatively high force per box to meet the required molding pressures.

The present invention is shown in FIGS. 5 and 6. Box elements have the same numbers. In FIG. 6, the mold configuration 21 of box 11 is shown. Inner surfaces 23 of the box are formed in the mold cavity, and outer surfaces 25 of the box are formed by a thin mold core, which is supported at opposite ends. Relatively little projected area, determined by the cumulative total of edge sections 6 and 7 and back 9, is required in the mold.

FIG. 5 show the mold configuration 31 of the present invention for box 1. Inner surfaces 33 of the box are formed by the mold cavity, and the outer surfaces 35 of the box 1 are formed by a core which is supported at both ends. One or two gates 37 are used to supply the molding material to the mold cavity.

FIG. 7 is a detail of the mold parts 41 for forming the living hinges 43 between the back 9 and the cover 5, and between the back 9 and the base 3, in both boxes 1 and 11. A sloped edge 45 of the cavity, together with an adjacent edge 47 of the core, forms a constricted area of the molded container which forms the hinge 43.

FIG. 8 is a schematic representation of the mold 51, which include the cavity 53 and the core 55. The space 57 between the cavity 53 and core 55 receives the molding material and forms the thickness of the box 1 or 11.

Figure 9:
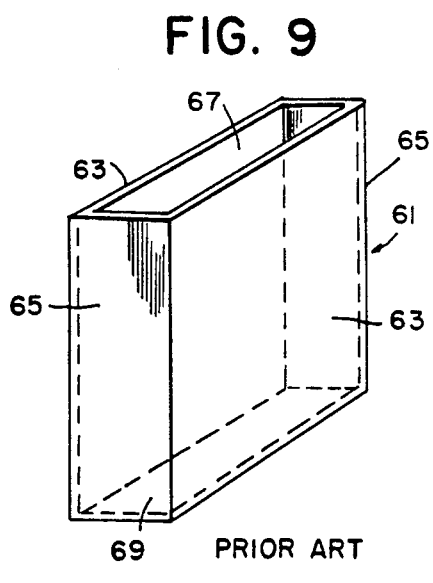
FIG. 9 is a detail of a typical five-sided sleeve which is used for holding video cassettes, and which is typically molded by a long unsupported core such as shown in FIG. 8.

FIG. 9 shows an alternative prior art sleeve 61 for receiving and storing a video cassette tape. The sleeve 61 is a high aspect container which has opposite large side walls 63, edge walls 65 and an opening 67, through which the video cassette is inserted and removed.

Molding in a conventional mold requires a long unsupported cantilevered core to fit within the opening 67, and to extend through the interior of the sleeve 61. The mold pressures tend to move the core laterally, and eventually the tolerances of the wall thicknesses, particularly walls 63, suffer, requiring mold maintenance and repair and the shutting down of molding operations.

Figure 10:
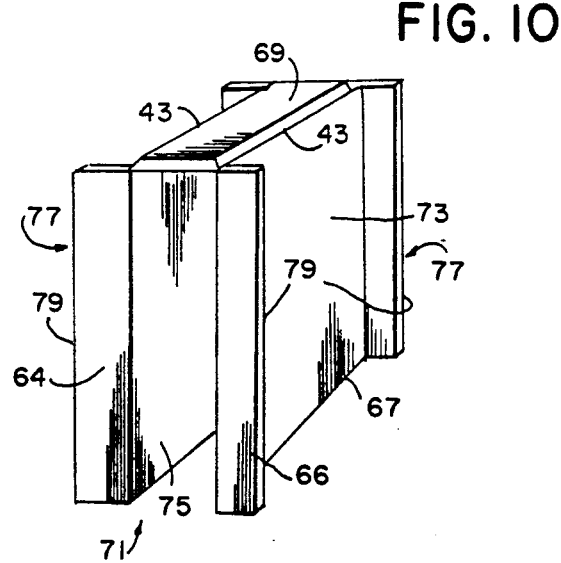
FIG. 10 is a preferred form of molding the five-sided sleeve shown in FIG. 9 according to the present invention.

The sleeve 61 is formed in the present invention in the mold configuration 71 shown in FIG. 10. Base 69 is formed with living hinges 43 along its edges, and the side walls 65 are split into two portions 64 and 66. The opening 67 is left at the bottom. The sleeve 61 can thus be made in a fixed cavity which forms the interior walls 73 of the sleeve, while a core supported at opposite ends forms the outer walls 75 of the sleeve. When the sleeve is removed from the mold, the two halves 77 are folded upward around the living hinges 43, and the adjacent edges 79 of the portions 64 and 66 of the side wall 65 are fused or welded together or bonded together.

FIG. 11 shows a molded container 81 in molded form with a mold insert-created pressfit post hole 83 in a front wall 85. An interfitting post 87 is formed in the cover 5.

FIG. 12 shows an assembled configuration 89 of the molded box 81, with the post 87 inserted in the post hole 83.

FIG. 13 shows an alternate form 91 of a molded container with side walls 7 divided into portions 4 and 6, and a front wall 93 permanently joined to base 3 and to side wall portions 4.

Cover 5 and base 3 are joined by a back 9, which is connected by living hinges 43. The cover has integrally formed therein a tongue 95 with an extended tongue 97, and interfitting snaps 96 and 98. The molded tongue 97 is joined to the cover 5 and the integrally molded tongue 95 with a living hinge 99.

FIG. 14 shows an alternate form 101 of a container which is suitable for holding compact discs. The container has a base 3, a cover 5, a fixed tongue 95 and a movable tongue 97. Snaps 96 and 98 are configured as hubs to hold a compact disc spaced from the interior walls of the cover 5 and base 3, and tongues 95 and 97. Front wall 103 and side walls 7 are integrally molded with the base 3. The unique back 109 has an integrally molded box-like spacer portion 107, which folds inside end walls 7. A cover portion 105 is joined to the back wall 109 by hinge 106, and the cover portion 105 overlies a side portion 108 of the box-like insert 107 when the box is folded together. Living hinge 111 separates the cover portion 105 and main cover 5 so that only the main cover 5 moves around hinge 111 when the box is opened.

For purposes of clarity and continuity in description, the planar member 5 is described as the cover. Actually the box 101 is used upside down with the planar member 5 pivoting downward about hinge 111 or the remainder of the box moving upward about that hinge.

The integral inside out forming of compact disc box with a cover hinged along a front edge of a box-like spine provides an inexpensive and effective compact disc storage box.

While the invention has been described with reference to specific embodiments, modifications and variations of the invention may be constructed without departing from the scope of the invention, which is defined in the following claims.

We claim:

1. A method of forming a integral box having a high aspect ratio of flat surface to depth, comprising molding the box in an inside out condition in a mold by forming a box bottom in a bottom cavity facing in one direction in a mold, and forming a box top in a top cavity facing in an opposite direction in a mold, with planar cavities for forming the top and bottom being arranged parallel in the mold, and forming a box back in a back-forming cavity being arranged transverse to the top and bottom cavities, and being joined to the top and bottom cavities by hinge-forming restrictions in the mold, thereby forming hinges between the top and back and the bottom and back, removing the box from the mold, and relatively folding the box top and bottom about the hinges for joining the top and bottom in a box.

2. A method of molding a integral box having a high aspect ratio of flatness to thickness, comprising molding the box inside-out in a mold having a cavity with outer surfaces forming inner surfaces of the box, and having a core extending into the cavity for forming flat outer parallel surfaces of a top and a bottom of a box, and having an end of the core forming an outer surface of a back of the box, edges of the end of the core which forms the back being closely spaced to corresponding edge portions of the cavity for forming relatively thin hinges between the back and the top and bottom of the box, and removing the box from the cavity and reversely folding the top and bottom about the hinges for forming the box.

3. The method of claim 2, further comprising forming a projection in the box back-forming portion of the cavity for forming an additional hinge in a center of the back.

4. The method of claim 2, further comprising forming a recess in the back-forming portion of the cavity, the recess being positioned along one longitudinal half of the back-forming portion, and further comprising forming a medial restriction in the back-forming portion for providing a medial hinge, whereby the medial hinge forms a hinge at an intersection between a back of the box and a top of the box, and further forming a third hinge between a top of the box and a cover.

5. The method of claim 4, further comprising a first snap cavity formed in the cavity portion which forms the inner wall of the cover and a tongue extension cavity on the cover-forming cavity, and a second snap cavity portion formed on a distal end of the tongue cavity for connecting to the first snap.

6. A method of molding a high aspect ratio integral box having a cover and a side wall, comprising molding the box inside out between a cavity and a core, forming inner surfaces of the box with outer surfaces of the cavity, and forming outer surfaces of the box with inner surfaces of the core, removing the box from the mold cavity and reversely folding the box so that inner surfaces of the box face inward, and outer surfaces of the box face outward.

7. The method of claim 6, further comprising removing the box from the core, folding the box about hinges between surfaces and a back, and welding side wall portions of the box, thereby forming a sleeve.

* * * * *